(12) United States Patent
Lee et al.

(10) Patent No.: US 12,051,827 B2
(45) Date of Patent: Jul. 30, 2024

(54) ELECTRODE ASSEMBLY CONFIGURED SUCH THAT PRESSURE WELDING PORTIONS OF ELECTRODE TAB WELDING PORTIONS HAVE DIFFERENT SIZES AND ULTRASONIC WELDING APPARATUS CONFIGURED TO MANUFACTURE THE SAME

(71) Applicant: LG Chem, Ltd., Seoul (KR)

(72) Inventors: Hyeon Jin Lee, Daejeon (KR); Dong Hyeuk Park, Daejeon (KR); Myoung Jin Ko, Daejeon (KR); Hyo Jin Lee, Daejeon (KR); Sung Jun Jo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 896 days.

(21) Appl. No.: 17/041,124

(22) PCT Filed: Jan. 15, 2020

(86) PCT No.: PCT/KR2020/000722
§ 371 (c)(1),
(2) Date: Sep. 24, 2020

(87) PCT Pub. No.: WO2020/159116
PCT Pub. Date: Aug. 6, 2020

(65) Prior Publication Data
US 2021/0119305 A1    Apr. 22, 2021

(30) Foreign Application Priority Data
Feb. 1, 2019  (KR) .................. 10-2019-0013308

(51) Int. Cl.
*H01M 50/536*    (2021.01)
*B23K 20/10*     (2006.01)
(Continued)

(52) U.S. Cl.
CPC .......... *H01M 50/536* (2021.01); *B23K 20/10* (2013.01); *H01M 50/531* (2021.01); *B23K 2101/36* (2018.08)

(58) Field of Classification Search
CPC .. H01M 50/536; H01M 50/531; B23K 20/10; B23K 2101/36
See application file for complete search history.

(56) References Cited

U.S. PATENT DOCUMENTS

| 4,736,881 A | 4/1988 | Niebuhr |
| 2002/0112330 A1 | 8/2002 | Ohno et al. |

(Continued)

FOREIGN PATENT DOCUMENTS

| CN | 101778690 A | 7/2010 |
| CN | 109108455 A | 1/2019 |

(Continued)

OTHER PUBLICATIONS

Search Report from Chinese Application No. 202080001913.9 dated Jul. 14, 2021. 3 pgs.

(Continued)

*Primary Examiner* — Matthew T Martin
*Assistant Examiner* — Taylor Harrison Krone
(74) *Attorney, Agent, or Firm* — Lerner David LLP

(57) ABSTRACT

Disclosed is an electrode assembly formed in a structure in which a plurality of positive electrodes with bundled positive electrode tabs and a plurality of negative electrodes with bundled negative electrode tabs are alternately stacked, each of the bundles of electrode tabs includes a first surface connected to a corresponding electrode lead and a second surface opposite the first surface, the first surface includes a plurality of first pressure welding portions and a plurality of first non-pressure, the second surface includes a plurality of second pressure welding portions and a plurality of second (Continued)

non-pressure welding portions The area of one of the first pressure welding portions is less than the area of one of the second pressure welding portions.

12 Claims, 6 Drawing Sheets

(51) Int. Cl.
*B23K 101/36* (2006.01)
*H01M 50/531* (2021.01)

(56) References Cited

U.S. PATENT DOCUMENTS

| | | |
|---|---|---|
| 2006/0169388 A1 | 8/2006 | Shimizu et al. |
| 2008/0070111 A1 | 3/2008 | Abe et al. |
| 2010/0140325 A1 | 6/2010 | Tokutomi et al. |
| 2014/0087245 A1* | 3/2014 | Lee ................. H01M 50/55 228/1.1 |
| 2014/0255768 A1 | 9/2014 | Jang |
| 2015/0147598 A1* | 5/2015 | Inoue ............... H01M 50/574 429/7 |
| 2018/0369953 A1 | 12/2018 | Miyashiro et al. |

FOREIGN PATENT DOCUMENTS

| | | | | |
|---|---|---|---|---|
| EP | 0083707 | A1 | 7/1983 | |
| JP | H0488620 | A | 3/1992 | |
| JP | 2002198262 | A | 7/2002 | |
| JP | 2010282846 | * | 12/2010 | .............. H01M 2/26 |
| JP | 2010282846 | A | 12/2010 | |
| JP | 2014212012 | * | 4/2013 | .............. Y02P 70/50 |
| JP | 2014203780 | A | 10/2014 | |
| JP | 2014212012 | A | 11/2014 | |
| JP | 5884908 | B2 | 3/2016 | |
| KR | 20060087419 | A | 8/2006 | |
| KR | 20080005097 | A | 1/2008 | |
| KR | 20120065279 | A | 6/2012 | |
| KR | 20120130958 | A | 12/2012 | |
| KR | 20140087985 | A | 7/2014 | |
| KR | 20140110353 | A | 9/2014 | |
| KR | 20150016348 | A | 2/2015 | |

OTHER PUBLICATIONS

Search report from International Application No. PCT/KR2020/000722, mailed Apr. 24, 2020.

\* cited by examiner

[FIG. 4]
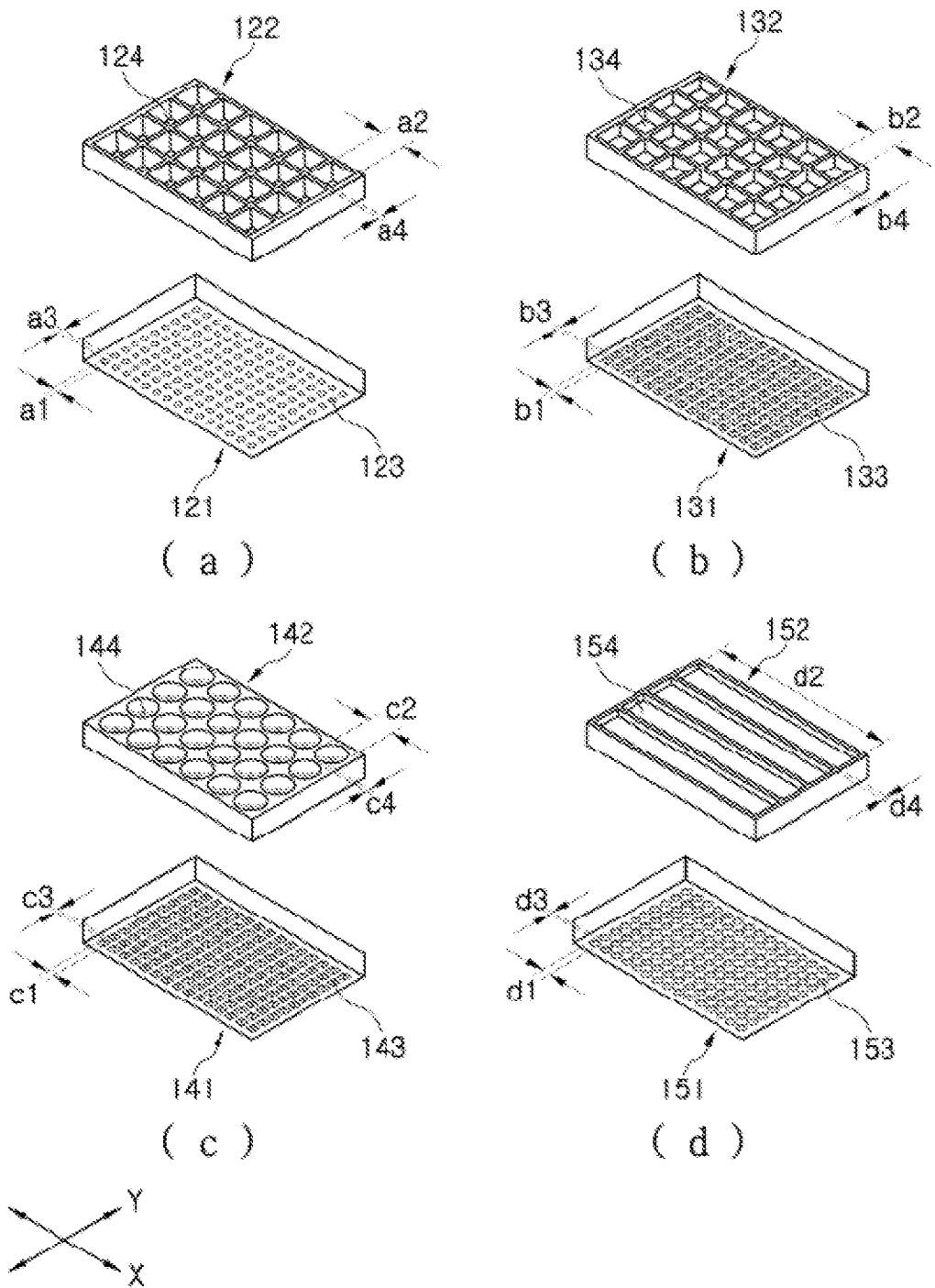

[FIG. 5]
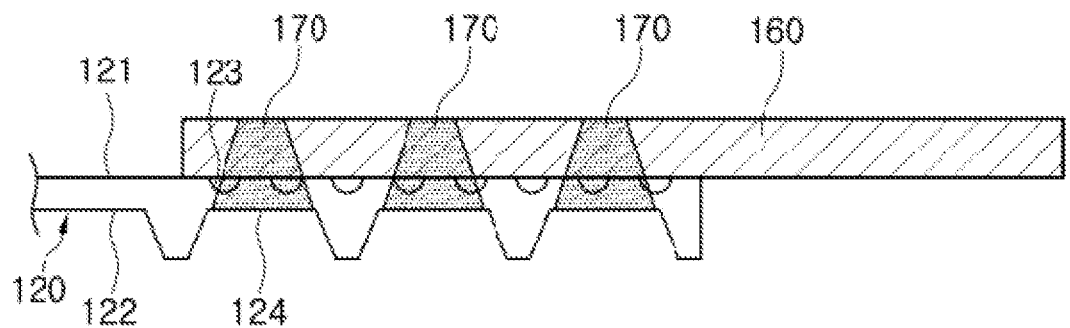

[FIG. 6]
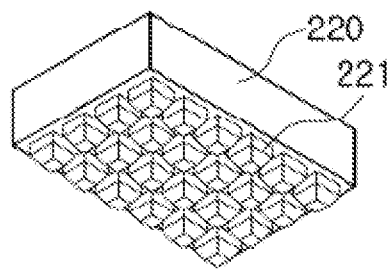
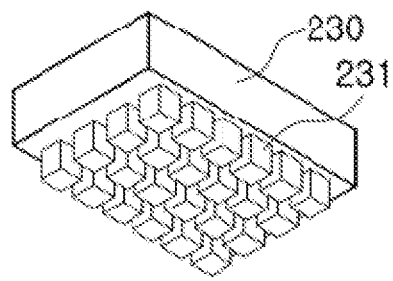
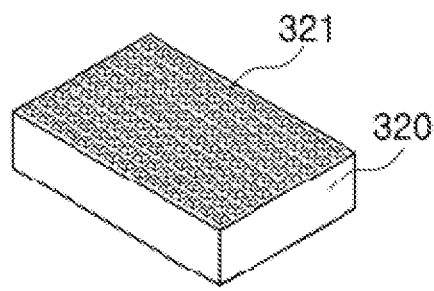
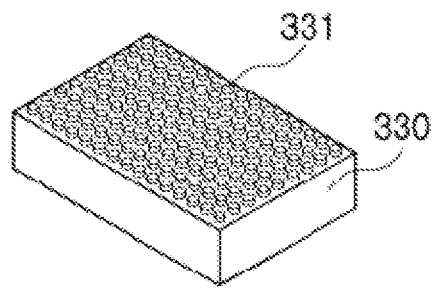
(a)  (b)
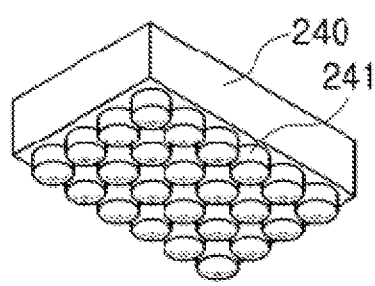
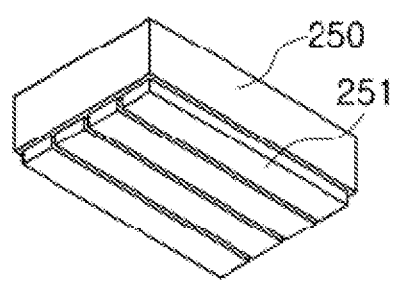
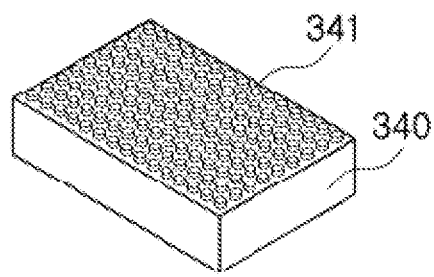
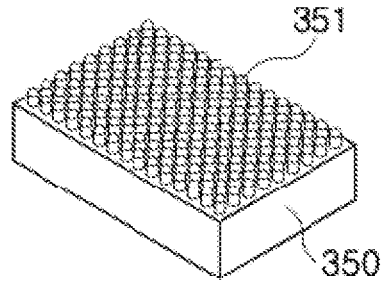
(c)  (d)

ELECTRODE ASSEMBLY CONFIGURED SUCH THAT PRESSURE WELDING PORTIONS OF ELECTRODE TAB WELDING PORTIONS HAVE DIFFERENT SIZES AND ULTRASONIC WELDING APPARATUS CONFIGURED TO MANUFACTURE THE SAME

CROSS-REFERENCE TO RELATED APPLICATIONS

This application is a national phase entry under 35 U.S.C. § 371 of International Application No. PCT/KR2020/000722, filed Jan. 15, 2020, which claims the benefit of priority to Korean Patent Application No. 10-2019-0013308 filed on Feb. 1, 2019, the disclosure of which is hereby incorporated by reference herein its entirety.

TECHNICAL FIELD

The present invention relates to an electrode assembly configured such that pressure welding portions of electrode tab welding portions have different sizes and an ultrasonic welding apparatus configured to manufacture the same, and more particularly to technology capable of increasing the force of coupling between a bundle of electrode tabs and an electrode lead by differently setting the shape of opposite welding portions of the bundle of electrode tabs.

BACKGROUND ART

The demand for secondary batteries as energy sources of electronic devices, such as mobile phones, laptop computers, and wearable devices, electric vehicles, etc. has increased. Depending on the kind of an electrode, secondary batteries are classified into a nickel-cadmium secondary battery, a nickel metal hydride secondary battery, and a lithium secondary battery, and research and development have been actively conducted on the lithium secondary battery, which has advantages of high operating voltage and high energy density per unit weight.

Depending on the shape of a battery case, the lithium secondary battery is classified as a can-shaped secondary battery or a cylindrical secondary battery, configured such that the electrode assembly is mounted in a metal can, or a pouch-shaped secondary battery, configured such that the electrode assembly is mounted in a pouch case made of an aluminum laminate sheet.

The electrode assembly may be a stacked type electrode assembly having a structure in which flat electrodes having electrode tabs protruding from one side or opposite sides thereof are stacked, and the electrode tabs in the stacked state are coupled to an electrode lead in the state of forming a bundle of electrode tabs in order to constitute an electrode terminal.

At the time of welding to form the bundle of electrode tabs, however, welding defects may occur. For example, portions at which the electrode tabs are not completely coupled to each other in tight contact and are separated from each other are formed, or pores may be formed in welding portions.

For example, in the case in which laser welding is performed above a space formed between the bundle of electrode tabs and the electrode lead or laser welding is performed above the portions at which the electrode tabs are separated from each other in order to connect the bundle of electrode tabs to the electrode lead, welding defects may occur, since the laser welding is performed in the state in which pores are formed therein. Also, in order to prevent this problem, accuracy may be required in the process of positioning laser welding portions.

In connection therewith, Patent Document 1 discloses a secondary battery configured such that welding point density of the welding joint surface of each of a positive electrode lead connected to positive electrode tabs and a negative electrode lead connected to negative electrode tabs has different values depending on the position thereof.

Specifically, Patent Document 1 increases mechanical strength of a welding portion by forming the welding point density of the welding joint surface such that the welding point density at each of opposite sides thereof is higher than the welding point density at the middle thereof, but uses ultrasonic welding in order to connect the electrode tabs and the electrode lead to each other, and does not suggest a method of removing a space formed between the electrode tabs and the electrode lead when connecting the electrode tabs and the electrode lead to each other using laser welding.

Patent Document 2 discloses a sheet-shaped secondary battery configured such that, at a connection portion between a positive electrode lead and a plurality of sheet-shaped positive electrodes and a connection portion between a negative electrode lead and a plurality of sheet-shaped negative electrodes, the plurality of sheet-shaped positive electrodes and the plurality of sheet-shaped negative electrodes are connected to the positive electrode lead and the negative electrode lead in the state of being stacked thereon, and at the same time a conductive connection protective layer is formed therebetween.

Patent Document 2 prevents damage to the sheet-shaped electrodes by including the connection protective layer, but does not disclose technology capable of preventing welding defects between the electrode tabs and the electrode lead.

Patent Document 3 relates to an ultrasonic joining apparatus configured to increase strength of a joint portion of a material to be joined after ultrasonic joining and a joining structure, wherein gripping force at the outside is set so as to be less than gripping force at the inside at a gripping region of the material to be joined by an anvil and a horn.

Patent Document 4 discloses an ultrasonic horn including a first protrusion line formed in a first direction and a second protrusion line formed in a second direction at protrusions formed on the pressurizing surface of the ultrasonic horn.

However, in Patent Document 3, indentations of the outer portions of the opposite sides of the material to be joined are formed in symmetry, and Patent Document 4 discloses only the structure of the ultrasonic horn.

Therefore, there is a high necessity for technology capable of increasing the force of coupling between a bundle of electrode tabs and an electrode lead by overlapping a portion that connects the bundle of electrode tabs and the electrode lead to each other and a welding portion of the bundle of electrode tabs with each other.

(Prior Art Document)

Patent Document 1 Korean Patent Application Publication No. 2012-0130958 (2012 Dec. 4)

Patent Document 2 Korean Patent Application Publication No. 2008-0005097 (2008 Jan. 10)

Patent Document 3 Korean Patent Application Publication No. 2006-0087419 (2006 Aug. 2)

Patent Document 4 Korean Patent Application Publication No. 2014-0110353 (2014 Sep. 17)

DISCLOSURE

Technical Problem

The present invention has been made in view of the above problems, and it is an object of the present invention to provide an electrode assembly configured such that a coupling portion between a bundle of electrode tabs and an electrode lead is formed so as to overlap a pressure welding portion of the bundle of electrode tabs, whereby it is possible to prevent the occurrence of welding defects and an ultrasonic welding apparatus configured to manufacture the same.

Technical Solution

In order to accomplish the above object, a first embodiment of the present invention may be an electrode assembly configured to have a structure in which a plurality of positive electrodes and a plurality of negative electrodes are alternately stacked, wherein positive electrode tabs may protrude from an outer edge of the positive electrodes and the negative electrodes tabs may protrude from an outer edge of the negative electrode, the positive electrode tabs may be connected to an electrode lead and may be coupled to each other in order to form a bundle of positive electrode tabs, the negative electrode tabs may be connected to electrode lead and may be coupled to each other in order to form a bundle of negative electrode tabs, each of the bundles of electrode tabs may include a first surface connected to a corresponding one of the electrode leads and a second surface opposite the first surface, the first surface may include a plurality of first pressure welding portions and a plurality of first non-pressure welding portions excluding the first pressure welding portions, the second surface may include a plurality of second pressure welding portions and a plurality of second non-pressure welding portions excluding the second pressure welding portions, and the area of one of the first pressure welding portions may be less than the area of one of the second pressure welding portions.

Also, in a second embodiment, in each bundle, the vertical section of each of the first pressure welding portions or the second pressure welding portions may be formed in the shape of at least one of a trapezoid, a rectangle, a semiellipse, a semicircle, or a combination thereof.

Also, in a third embodiment, in each bundle, the vertical section of each of the first pressure welding portions and the vertical section of each of the second pressure welding portions may be different in shape from each other.

Also, in a fourth embodiment, in each bundle, the maximum surface-side diameter of each of the first pressure welding portions in vertical section may be less than the maximum surface-side diameter of each of the second pressure welding portions in vertical section.

Also, in a fifth embodiment, in each bundle, the distances between the first pressure welding portions and the distances between the second pressure welding portions may be uniformly formed.

Also, in a sixth embodiment, in each bundle, the entire area of the first pressure welding portions of the first surface may be less than the entire area of the first non-pressure welding portions of the first surface.

Also, in a seventh embodiment, each of the bundles of electrode tabs may be connected to the corresponding electrode lead by laser welding, and laser welding portions may be formed at portions that overlap the second pressure welding portions.

Also, in an eighth embodiment, the area of one of the laser welding portions may be greater than the area of one of the first pressure welding portions, and may be less than the area of one of the second pressure welding portions.

Also, as a ninth embodiment, the present invention may provide an ultrasonic welding apparatus configured to manufacture the electrode assembly, wherein the ultrasonic welding apparatus may include a horn configured to apply ultrasonic waves while pressurizing the upper surface of the electrode assembly and an anvil configured to locate the electrode assembly at the upper surface thereof, the anvil facing the lower surface of the electrode assembly, a plurality of horn protrusions and a plurality of anvil protrusions configured to pressurize the electrode assembly in order to form pressure welding portions may be provided at surfaces of the horn and the anvil, respectively, the size of a welding surface of one of the anvil protrusions and the size of a welding surface of one of the horn protrusions may be different from each other, and the anvil protrusions and the horn protrusions may be disposed opposite each other.

Also, in a tenth embodiment, in any one having a smaller size of the welding surface selected from between one of the anvil protrusions or one of the horn protrusions, the sum of areas of portions of the welding surface of the anvil or the horn at which the protrusions are formed may be less than the sum of areas of the portions at which no protrusions are formed.

As an eleventh embodiment, the present invention may provide a method of manufacturing the secondary battery, the method including stacking positive electrodes and negative electrodes such that a separator is located on at least one surface of each of the positive electrodes and the negative electrodes, locating electrode tabs between a horn and an anvil for ultrasonic welding, performing ultrasonic welding in order to form a bundle of electrode tabs, performing laser welding in order to connect an electrode lead to the bundle of electrode tabs, and disposing an electrode assembly connected to the electrode lead in a battery case, wherein sizes of pressure welding portions formed at opposite surfaces of the bundle of electrode tabs in the step of performing ultrasonic welding may be different from each other, and the size of one of the pressure welding portions formed in the direction in which coupling with the electrode lead is performed may be less than the size of one of the pressure welding portions formed in the opposite direction.

Also, in a twelfth embodiment, the step of performing laser welding may be applying a laser above the outer surface of the bundle of electrode tabs or above the outer surface of the electrode lead to melt the bundle of electrode tabs and the electrode lead.

DESCRIPTION OF DRAWINGS

FIG. 4 is an upward perspective view and a downward perspective view of the bundle of electrode tabs of FIG. 3.

FIG. 5 is a side view of the state in which the bundle of electrode tabs is coupled to an electrode lead.

FIG. 6 is a perspective view of a horn and an anvil of an ultrasonic welding apparatus according to the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

An electrode assembly according to the present invention includes a structure in which flat electrode plates having electrode tabs protruding from one side or opposite sides thereof are stacked in the state in which separators are interposed therebetween, and may be a stacked type electrode assembly configured such that a plurality of positive electrode plates and a plurality of negative electrode plates are stacked in the state in which separators are interposed therebetween, a stacked/folded type electrode assembly configured such that stacked type unit cells, each of which includes two or three electrodes, are wound in the state of being located on a separation film so as to be spaced apart from each other by a predetermined distance, or a laminated/stacked type electrode assembly configured such that the unit cells are laminated in the state of being stacked in a plurality of numbers in the vertical direction.

The electrode tabs protruding from the electrode assembly are coupled to each other by welding in order to form a bundle of positive electrode tabs and a bundle of negative electrode tabs, which are then coupled to a positive electrode lead and to a negative electrode lead, respectively, so as to function as electrode terminals.

Figure 1:
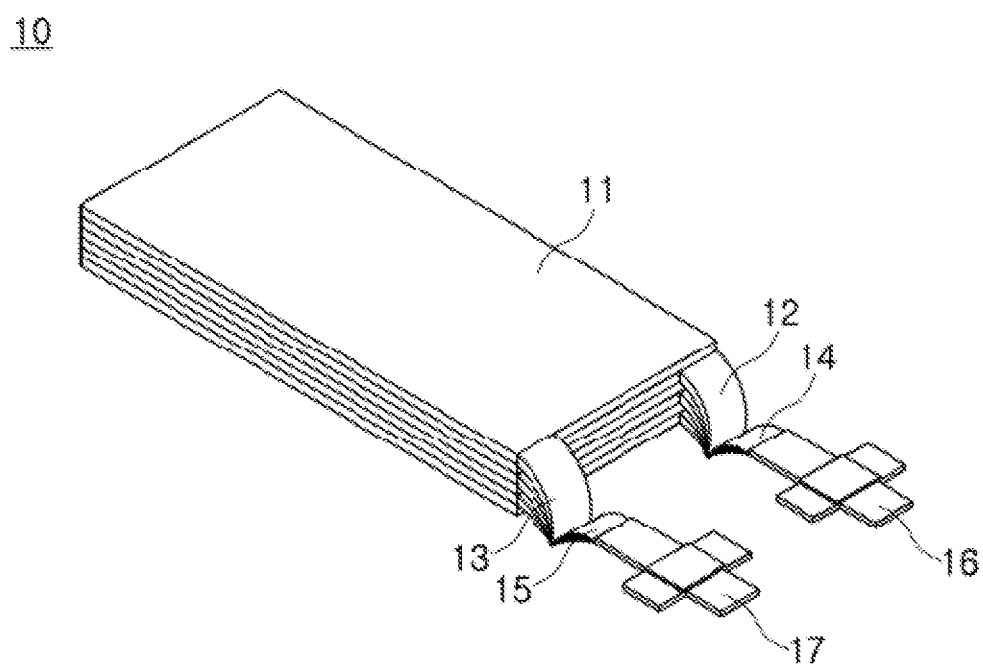
FIG. 1 is a perspective view of an electrode assembly according to the present invention.

In connection therewith, FIG. 1 is a perspective view showing an electrode assembly according to the present invention.

Referring to FIG. 1, the electrode assembly 10 is a stacked type electrode assembly having a structure in which flat electrode plates 11 are stacked, wherein positive electrode tabs 12 are coupled to each other in the state of protruding to one side thereof in order to form a bundle of positive electrode tabs 14 and negative electrode tabs 13 are coupled to each other in the state of protruding to one side thereof in order to form a bundle of negative electrode tabs 15. The bundle of positive electrode tabs 14 is coupled to a positive electrode lead 16, which extends outside a battery case to constitute a positive electrode terminal, and the bundle of negative electrode tabs 15 is coupled to a negative electrode lead 17, which extends outside the battery case to constitute a negative electrode terminal.

Figure 2:
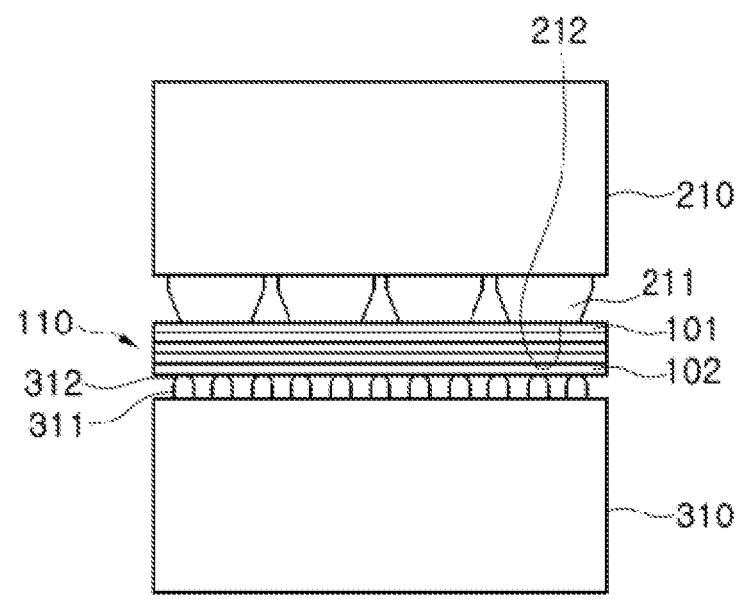
FIG. 2 is a side view showing the state in which electrode tabs are located between a horn and an anvil of an ultrasonic welding apparatus in order to form a bundle of electrode tabs.

FIG. 2 is a side view showing the state in which electrode tabs are located between a horn and an anvil of an ultrasonic welding apparatus in order to form a bundle of electrode tabs.

Referring to FIG. 2, the ultrasonic welding apparatus includes a horn 210 located at the upper surface of electrode tabs, the horn being configured to pressurize the electrode tabs while applying ultrasonic waves, and an anvil 310 configured to locate the electrode tabs 101 and 102 at the upper surface thereof.

The electrode tabs 101 and 102 in the stacked state are located between the horn 210 and the anvil 310, and ultrasonic waves are applied to the electrode tabs 101 and 102 in order to couple the electrode tabs to each other and thus to form a bundle of electrode tabs 110.

In general, the ultrasonic welding apparatus includes an ultrasonic oscillator, an ultrasonic vibrator, a booster, a horn, and an anvil.

The ultrasonic oscillator converts an AC current of 60 Hz into a high-frequency current of 20 kHz or higher, and supplies the high-frequency current to the ultrasonic vibrator.

The ultrasonic vibrator functions to convert electrical energy into mechanical energy, and is also called an ultrasonic piezoelectric element. That is, a high-frequency current generated by the ultrasonic oscillator is converted into ultrasonic waves by the ultrasonic vibrator, and the ultrasonic waves converted as described above are transmitted to the booster. The booster amplifies the received ultrasonic waves, and transmits the amplified ultrasonic waves to the horn.

The horn pressurizes the surface of the electrode tabs placed on the anvil at a predetermined load, and at the same time applies the amplified ultrasonic waves, received from the booster, to the electrode tabs in order to weld a plurality of positive electrode tabs to each other and to weld a plurality of negative electrode tabs to each other.

In FIG. 2, horn protrusions 211, each of which is formed so as to have a trapezoidal shape in vertical section, are formed on the horn 210, and anvil protrusions 311, each of which is formed so as to have a semielliptical shape in vertical section, are formed on the anvil 310.

In a concrete example, one of the opposite sides of a bundle of electrode tabs formed by welding electrode tabs is coupled to an electrode lead. In order to increase the force of coupling between the electrode lead and the bundle of electrode tabs, the area of a pressure welding portion formed at one side of the bundle of electrode tabs, which is coupled to the electrode lead, is preferably formed so as to be less than the area of a pressure welding portion formed at the other side of the bundle of electrode tabs, which is not coupled to the electrode lead.

For example, in the case of FIG. 2, the size of a welding surface 312 of each of the anvil protrusions 311 formed at the anvil 310 is formed so as to be less than the size of a welding surface 212 of each of the horn protrusions 211 formed at the horn 210, and a pressure welding portion by each of the horn protrusions 211 is formed so as to be larger than a pressure welding portion by each of the anvil protrusions 311.

That is, in the case in which electrode tabs are coupled to each other to form a bundle of electrode tabs, an electrode lead is preferably coupled to the electrode tab 102, since the size of a pressure welding portion formed at the electrode tab 102 side that faces the anvil 310 is formed so as to be relatively small.

In addition, since the electrode lead is attached to the outer surface of the bundle of electrode tabs 110 that faces the anvil 310, non-pressure welding portions of the outer surface of the bundle of electrode tabs to which the electrode lead is attached are wide. The distance between the respective protrusions 311 formed at the anvil 310 may be formed so as to be greater than the distance between the respective protrusions 211 formed at the horn 210.

The bundle of electrode tabs is coupled to the electrode lead at the outer surface of the uppermost electrode tabs or the outer surface of the lowermost electrode tabs. The outer surface of the electrode tab that is connected to the electrode lead is referred to as a first surface, and the outer surface of the electrode tab that is located so as to be opposite the first surface based on the bundle of electrode tabs is referred to as a second surface.

The first surface includes a plurality of first pressure welding portions and a plurality of first non-pressure welding portions excluding the first pressure welding portions, the second surface includes a plurality of second pressure welding portions and a plurality of second non-pressure welding portions excluding the second pressure welding portions, and the area of one of the first pressure welding portions is formed so as to be less than the area of one of the second pressure welding portions.

The pressure welding portion, more specifically the first pressure welding portions and the second pressure welding portions, is a portion at which coupling is performed by welding, and is used as the same meaning as an intaglio welding portion, and the non-pressure welding portion, more specifically the first non-pressure welding portions and the second non-pressure welding portions, is a non-coupling portion that is not welded, and is used as the same meaning as a relief welding portion.

Specifically, since the first surface is a portion at which the bundle of electrode tabs and the electrode lead are connected to each other, the intaglio welding portion is preferably narrow and the relief welding portion is preferably wide in order to widen an adhesive surface with the electrode lead. Since the coupling portion of the electrode tabs is narrowed as the intaglio welding portion is narrowed, however, poor joining between the electrode tabs may occur, for example, a gap may be formed between the electrode tabs. In order to prevent this, the entire area of the second pressure welding portions, which are an intaglio welding portion, of the second surface is formed so as to be greater than the entire area of the first pressure welding portions of the first surface.

In addition, the area of one of the first pressure welding portions is formed so as to be less than the area of one of the second pressure welding portions, whereby the second pressure welding portions and the first pressure welding portions may overlap each other. When considering that the relief welding portion of the first surface is preferably relatively wide and the intaglio welding portion of the second surface is preferably relatively wide, the sum of the areas of the first pressure welding portions of the first surface may be less than the sum of the areas of the second pressure welding portions of the second surface.

The vertical section of each of the first pressure welding portions and the second pressure welding portions may be formed in the shape of at least one of a straight line, a curved line, a trapezoid, a rectangle, a semiellipse, a semicircle, or a combination thereof, and the vertical section of each of the first pressure welding portions and the vertical section of each of the second pressure welding portions may be different in shape from each other.

Figure 3:
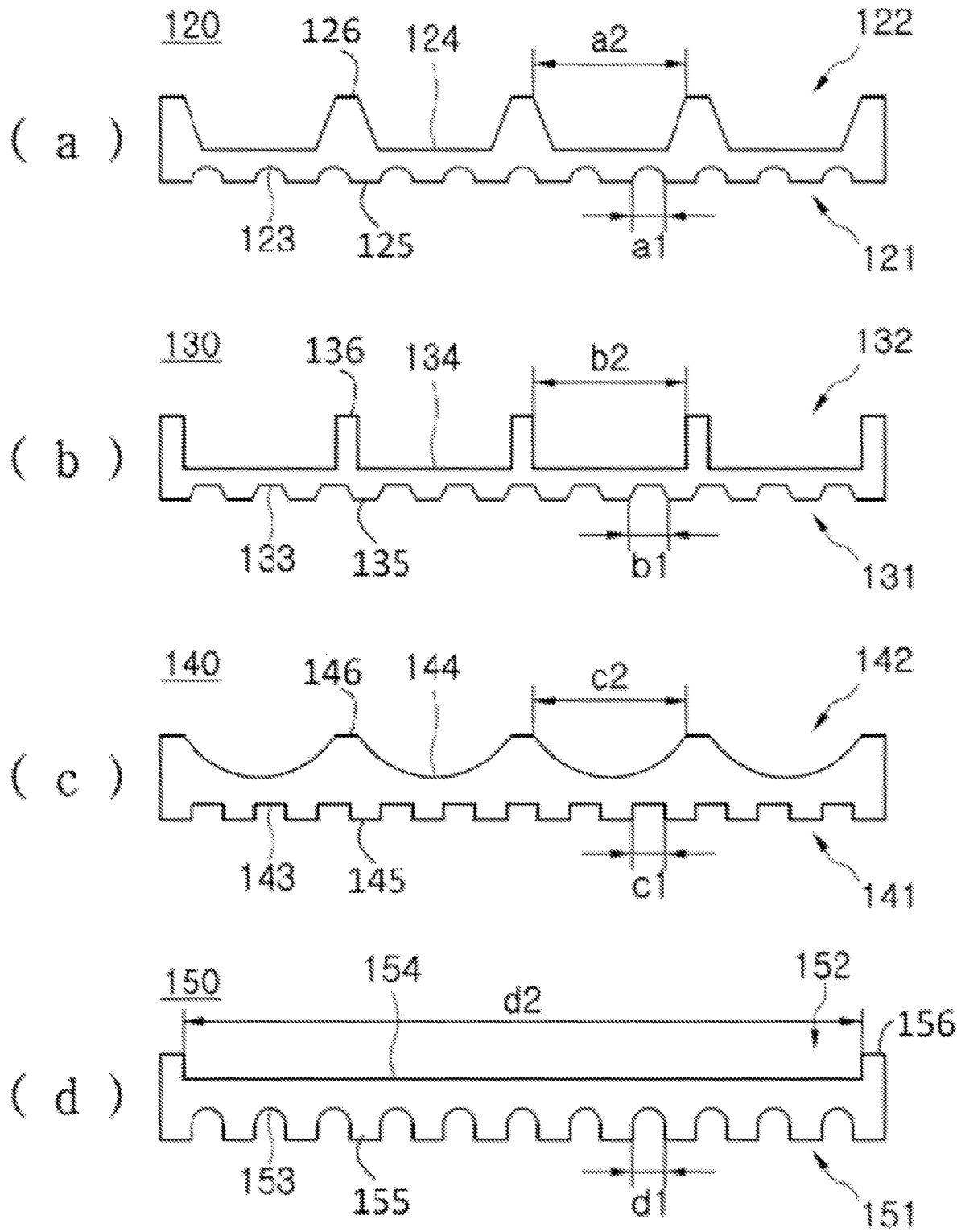
FIG. 3 is a vertical sectional view of a bundle of electrode tabs according to a concrete embodiment.

In connection therewith, FIG. 3 is a vertical sectional view of a bundle of electrode tabs according to a concrete embodiment, and FIG. 4 is an upward perspective view and a downward perspective view of the bundle of electrode tabs of FIG. 3. The bundle of electrode tabs is configured to have an integral structure in which a plurality of electrode tabs is welded in the state of being stacked, and the border between the stacked tabs is not shown for convenience of understanding.

Referring to FIGS. 3 and 4, opposite surfaces of a bundle of electrode tabs 120, 130, 140, or 150 include a first surface 121, 131, 141, or 151, which is coupled to an electrode lead, and a second surface 122, 132, 142, or 152, which is opposite the first surface.

First pressure welding portions 123, 133, 143, or 153 and first non-pressure welding portions 125, 135, 145, or 155 are formed at the first surface 121, 131, 141, or 151, and second pressure welding portions 124, 134, 144, or 154 and second non-pressure welding portions 126, 136, 146, or 156 are formed at the second surface 122, 132, 142, or 152. When considering that the vertical sectional shape of each of the pressure welding portions is variously formed, the maximum surface-side diameter $a1$, $b1$, $c1$, or $d1$ of each of the first pressure welding portions 123, 133, 143, or 153 is formed so as to be less than the maximum surface-side diameter $a2$, $b2$, $c2$, or $d2$ of each of the second pressure welding portions 124, 134, 144, or 154.

Specifically, the diameter $a1$, $b1$, $c1$, or $d1$ of each of the first pressure welding portions 123, 133, 143, or 153 may be formed so as to be 70% or less, more specifically 50% or less, of the diameter $a2$, $b2$, $c2$, or $d2$ of each of the second pressure welding portions 124, 134, 144, or 154. Consequently, each of the second pressure welding portions overlaps at least one of the first pressure welding portions, whereby it is possible to prevent an empty space from being formed between the electrode tabs.

Also, in order to secure uniform weldability at the entirety of the bundle of electrode tabs and to easily perform the process of forming the first pressure welding portions and the second pressure welding portions so as to overlap each other, the distances $a3$, $b3$, $c3$, or $d3$ between the first pressure welding portions 123, 133, 143, or 153 in the x direction and the y direction are formed so as to have uniform sizes, and the distances $a4$, $b4$, $c4$, or $d4$ between the second pressure welding portions 124, 134, 144, or 154 in the x direction and the y direction are formed so as to have uniform sizes.

FIG. 5 is a side view of the state in which the bundle of electrode tabs is coupled to an electrode lead.

Referring to FIG. 5, the bundle of electrode tabs 120 is formed such that the first pressure welding portions 123 of the first surface 121 and the second pressure welding portions 124 of the second surface 122 overlap each other in the vertical direction, the first surface 121 of the bundle of electrode tabs 120 is coupled to the electrode lead 160.

In FIG. 5, the state in which a laser is applied from outside the electrode lead 160 in order to couple the bundle of electrode tabs 120 to the electrode lead 160 is shown. However, the direction in which the laser is applied is not limited to the direction toward the electrode lead, and the laser may be applied from outside the bundle of electrode tabs 120.

The laser passes through the electrode lead 160 and the bundle of electrode tabs 120, and melts the overlapping portion of the electrode lead 160 and the bundle of electrode tabs 120 to couple the electrode lead and the bundle of electrode tabs to each other. The size of one of laser welding portions 170 is greater than the size of one of the first pressure welding portions 123, and is less than the size of one of the second pressure welding portions 124. The laser passes through the overlapping portions of the first pressure welding portions 123 and the second pressure welding portions 124, and the laser welding portions 170 may be formed so as to overlap the second pressure welding portions 124 therein. Consequently, the electrode lead 160 may be coupled to the coupling portions of the electrode tabs.

As a result, no space is formed between the bundle of electrode tabs 120 and the electrode lead 160, and it is possible to increase the area of the tight coupling portions thereof.

FIG. 6 is a perspective view of a horn and an anvil of an ultrasonic welding apparatus according to the present invention.

Referring to FIGS. 6(a) to 6(d), the size of the welding surface of one of anvil protrusions 321, 331, 341, or 351 formed at an anvil 320, 330, 340, or 350 is formed so as to be less than the size of the welding surface of one of horn protrusions 221, 231, 241, or 251 formed at a horn 220, 230, 240, or 250.

Although FIG. 6 exemplarily shows the shape of the horn protrusions 221, 231, 241, and 251 and the anvil protrusions 321, 331, 341, and 351, the combination of the anvil and the horn is not limited to what is shown in FIG. 6 as long as the size of the welding surface of one of the protrusions formed at the anvil is selected so as to be less than the size of the welding surface of one of the protrusions formed at the horn.

Also, in the case in which the surface of a bundle of electrode tabs that contacts the anvil, which is one of the opposite surfaces of the bundle of electrode tabs, is coupled to an electrode lead, the area of a relief welding portion is preferably greater than the area of an intaglio welding portion at the contact surface between the electrode lead and the bundle of electrode tabs in order to widen the contact surface, and the sum of the areas of the welding surfaces of the protrusions formed at the anvil may be formed so as to be less than the sum of the areas of the portions at which no protrusions are formed.

Those skilled in the art to which the present invention pertains will appreciate that various applications and modifications are possible based on the above description, without departing from the scope of the present invention.

DESCRIPTION OF REFERENCE SYMBOLS

10: Electrode assembly
11: Electrode plates
12: Positive electrode tabs
13: Negative electrode tabs
14: Bundle of positive electrode tabs
15: Bundle of negative electrode tabs
16: Positive electrode lead
17: Negative electrode lead
101, 102: Electrode tabs
110, 120, 130, 140, 150: Bundles of electrode tabs
121, 131, 141, 151: First surfaces
122, 132, 142, 152: Second surfaces
123, 133, 143, 153: First pressure welding portions
124, 134, 144, 154: Second pressure welding portions
125, 135, 145, 155: First non-pressure welding portions
126, 136, 146, 156: Second non-pressure welding portions
160: Electrode lead
170: Laser welding portions
210, 220, 230, 240, 250: Horns
211, 221, 231, 241, 251: Horn protrusions
212, 312: Welding surfaces of protrusions
310, 320, 330, 340, 350: Anvils
311, 321, 331, 341, 351: Anvil protrusions
a1, b1, c1, d1: Diameters of first pressure welding portions
a2, b2, c2, d2: Diameters of second pressure welding portions
a3, b3, c3, d3: Distances between first pressure welding portions
a4, b4, c4, d4: Distances between second pressure welding portions

INDUSTRIAL APPLICABILITY

As is apparent from the above description, the present invention is capable of forming pressure welding portions at one surface of a bundle of electrode tabs that is coupled to an electrode lead, among welding portions of the bundle of electrode tabs, so as to be relatively small at the time of ultrasonic welding to form the bundle of electrode tabs, whereby it is possible to widen the contact surface with the electrode lead.

Consequently, it is possible to improve coupling strength of the portions at which the bundle of electrode tabs is connected to the electrode lead.

In addition, relatively large pressure welding portions are formed at the other surface of the bundle of electrode tabs that is not coupled to the electrode lead, whereby it is possible to prevent ultrasonic non-welding portions from being formed at the time of forming the bundle of electrode tabs.

In addition, the connection portions between the bundle of electrode tabs and the electrode lead are formed in the relatively large pressure welding portions so as to overlap each other, whereby it is possible to prevent a space from being formed between the bundle of electrode tabs and the electrode lead and thus to achieve tight coupling.

The invention claimed is:

1. An electrode assembly configured to have a structure in which a plurality of positive electrodes and a plurality of negative electrodes are alternately stacked, the electrode assembly comprising:
   positive electrode tabs protruding from an outer edge of the positive electrodes and negative electrode tabs protruding from an outer edge of the negative electrodes,
   the positive electrode tabs being coupled to each other in order to form a bundle of positive electrode tabs and the bundle of positive electrode tabs being connected to a positive electrode lead, the negative electrode tabs being coupled to each other in order to form a bundle of negative electrode tabs and the bundle of negative electrode tabs being connected to a negative electrode lead,
   wherein each of the bundles of electrode tabs comprises a first surface connected to a corresponding one of the electrode leads and a second surface opposite the first surface,
   wherein in each of the bundles, the first surface has a plurality of first pressure welding portions as an intaglio welding portion and a plurality of first non-pressure welding portions excluding the first pressure welding portions as a relief welding portion, the second surface has a plurality of second pressure welding portions as an intaglio welding portion and a plurality of second non-pressure welding portions excluding the second pressure welding portions as a relief welding portion, and wherein an area of one of the first pressure welding portions is less than an area of one of the second pressure welding portions.

2. The electrode assembly according to claim 1, wherein, in each bundle, a vertical section of each of the first pressure welding portions or the second pressure welding portions is formed in a shape of at least one of a trapezoid, a rectangle, a semiellipse, a semicircle, or a combination thereof.

3. The electrode assembly according to claim 1, wherein, in each bundle, a vertical section of each of the first pressure welding portions and a vertical section of each of the second pressure welding portions are different in shape from each other.

4. The electrode assembly according to claim 1, wherein, in each bundle, a maximum surface-side diameter of each of the first pressure welding portions in vertical section is less than a maximum surface-side diameter of each of the second pressure welding portions in vertical section.

5. The electrode assembly according to claim 1, wherein, in each bundle, distances between the first pressure welding portions and distances between the second pressure welding portions are uniformly formed.

6. The electrode assembly according to claim 1, wherein, in each bundle, an entire area of the first pressure welding portions of the first surface is less than an entire area of the first non-pressure welding portions of the first surface.

7. The electrode assembly according to claim 1, wherein each of the bundles of electrode tabs is connected to the corresponding electrode lead by laser welding, and laser welding portions are formed at portions that overlap the second pressure welding portions.

8. The electrode assembly according to claim 7, wherein an area of one of the laser welding portions is greater than an area of one of the first pressure welding portions, and is less than an area of one of the second pressure welding portions.

9. An ultrasonic welding apparatus configured to manufacture the electrode assembly according to claim 1, the ultrasonic welding apparatus comprising:

a horn configured to apply ultrasonic waves while pressurizing an upper surface of the electrode assembly and an anvil configured to locate the electrode assembly at an upper surface thereof, the anvil facing a lower surface of the electrode assembly, a plurality of horn protrusions and a plurality of anvil protrusions configured to pressurize the electrode assembly in order to form pressure welding portions are provided at surfaces of the horn and the anvil, respectively, wherein a size of a welding surface of one of the anvil protrusions and a size of a welding surface of one of the horn protrusions are different from each other, and wherein the anvil protrusions and the horn protrusions are disposed opposite each other.

10. The ultrasonic welding apparatus according to claim 9, wherein, in any one having a smaller size of the welding surface selected from between one of the anvil protrusions or one of the horn protrusions, a sum of areas of portions of the welding surface of the anvil or the horn at which the protrusions are formed is less than a sum of areas of the portions at which no protrusions are formed.

11. A method of manufacturing a secondary battery comprising the electrode assembly according to claim 1, the method comprising:

stacking the positive electrodes and the negative electrodes such that a separator is located on at least one surface of each of the positive electrodes and the negative electrodes;

locating the electrode tabs between a horn and an anvil for ultrasonic welding;

performing ultrasonic welding in order to form the bundles of electrode tabs;

performing laser welding in order to connect the electrode leads to the bundles of electrode tabs; and disposing the electrode assembly connected to the electrode lead in a battery case, wherein sizes of pressure welding portions formed at opposite surfaces of the bundle of electrode tabs in the step of performing ultrasonic welding are different from each other, and a size of one of the pressure welding portions formed in a direction in which coupling with the electrode lead is performed is less than a size of one of the pressure welding portions formed in an opposite direction.

12. The method according to claim 11, wherein the step of performing laser welding comprises applying a laser above an outer surface of the bundle of electrode tabs or above an outer surface of the electrode lead to melt the bundle of electrode tabs and the electrode lead.

* * * * *